(12) United States Patent
Hwang et al.

(10) Patent No.: US 10,746,271 B2
(45) Date of Patent: Aug. 18, 2020

(54) POWER TRANSMISSION APPARATUS FOR A VEHICLE

(71) Applicants: Hyundai Motor Company, Seoul (KR); KIA Motors Corporation, Seoul (KR)

(72) Inventors: Seong Wook Hwang, Gyeonggi-do (KR); Woochurl Son, Gyeonggi-do (KR); Kijong Park, Gyeonggi-do (KR); Sangwon Seo, Seoul (KR); Yong Uk Shin, Gyeonggi-do (KR); Seongwook Ji, Gyeonggi-do (KR); Ki Tae Kim, Incheon (KR); Chon Ok Kim, Gyeonggi-do (KR); Wonmin Cho, Gyeonggi-do (KR); Ma Ru Kang, Gyeonggi-do (KR); Ilhan Yoo, Jeollanam-do (KR); Juhyeon Park, Gyeonggi-do (KR); Minho Chae, Incheon (KR); Dongwoo Kim, Incheon (KR); Hye Jin Lim, Seoul (KR); Ki Been Lim, Gyeonggi-do (KR); Jin Yong Kim, Seoul (KR); Soonki Eo, Gyeonggi-do (KR); Ki DOng Kim, Gyeonggi-do (KR); Woo Jin Chang, Gyeonggi-do (KR); Yong Sug Choi, Gyeonggi-do (KR); Sun Sung Kwon, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/144,559

(22) Filed: Sep. 27, 2018

(65) Prior Publication Data
US 2019/0383361 A1 Dec. 19, 2019

(30) Foreign Application Priority Data

Jun. 14, 2018 (KR) .......................... 10-2018-0068336

(51) Int. Cl.
*F16H 37/08* (2006.01)
*F16H 3/00* (2006.01)
*F16H 61/688* (2006.01)

(52) U.S. Cl.
CPC ......... *F16H 37/0826* (2013.01); *F16H 3/006* (2013.01); *F16H 37/0833* (2013.01);
(Continued)

(58) Field of Classification Search
CPC ...... F16H 3/006; F16H 3/66; F16H 2037/047; F16H 2037/048; F16H 37/0826; F16H 37/0833
See application file for complete search history.

(56) References Cited

U.S. PATENT DOCUMENTS 8,323,142 B2 12/2012 Masumoto
9,982,764 B2 * 5/2018 Hwang ................... F16H 3/006
(Continued)

FOREIGN PATENT DOCUMENTS

EP 3121483 A1 1/2017

*Primary Examiner* — Erin D Bishop
(74) *Attorney, Agent, or Firm* — Brinks Gilson & Lione (57) ABSTRACT

A power transmission apparatus includes a first input shaft receiving an input torque, second and third input shafts coaxially disposed and selectively connected with the first input shaft, first and second torque mediating shafts coaxially disposed with the first input shaft, first and second intermediate shafts and an output shaft disposed in parallel with the first input shaft, a first shifting section receiving a torque from the third input shaft and outputting a plurality of first shifted torques, a second shifting section including a first planetary gear set selectively connected with the first input shaft and outputting a plurality of second shifted
(Continued)

torques, and a compound shifting section forming an output torque by the input torque and the first and second shifted torques.

16 Claims, 7 Drawing Sheets

(52) U.S. Cl.
CPC ... *F16H 61/688* (2013.01); *F16H 2200/0065* (2013.01); *F16H 2200/2007* (2013.01); *F16H 2200/2048* (2013.01)

(56) References Cited

U.S. PATENT DOCUMENTS

| | | | |
|---|---|---|---|
| 10,023,042 B2* | 7/2018 | Cho | B60K 6/485 |
| 2013/0031990 A1 | 2/2013 | Singh et al. | |
| 2017/0159779 A1* | 6/2017 | Hwang | F16H 3/006 |

\* cited by examiner

| Shift-stage | CL1 | CL2 | CL3 | CL4 | BK | SN1 | | | SN2 | | |
|---|---|---|---|---|---|---|---|---|---|---|---|
| | | | | | | TDG1 | N | TDG2 | TDG3 | N | H |
| REV | | ● | | ● | | ○ | | ○ | | | ● |
| FD1 | ● | | | ● | | ● | | | ○ | ● | ○ |
| FD2 | | ● | | ● | | ○ | | | ● | | |
| FD3 | ● | | | ● | | ○ | | ○ | ○ | ● | ○ |
| FD4 | | | ● | ● | | ○ | ● | ● | ○ | ● | ○ |
| FD5 | ● | | ● | | | | ● | ● | ○ | ● | ○ |
| FD6 | | ● | ● | | | ○ | | ● | ● | | |
| FD7 | ● | | ● | | | ● | ● | | ○ | ● | ○ |
| FD8 | | | ● | | ● | ○ | ● | ○ | | | ● |
| FD9 | | ● | ● | | | ○ | ● | ○ | | | ● |

● : Preliminary engagement available
○ : Preliminary engagement available

| | Shift-stage | Engine clutch (EC) | CL1 | CL2 | CL3 | CL4 | BK | SN1 | | | SN2 | | |
|---|---|---|---|---|---|---|---|---|---|---|---|---|---|
| | | | | | | | | TDG1 | N | TDG2 | TDG3 | N | H |
| Engine mode or Parallel mode | REV | ● | | ● | | ● | | ○ | ● | ○ | | | ● |
| | FD1 | ● | ● | | | ● | | ● | | | ○ | ● | ○ |
| | FD2 | ● | | ● | | ● | | ○ | ● | ○ | ● | | |
| | FD3 | ● | ● | | | ● | | | | ● | ○ | ● | ○ |
| | FD4 | ● | | | ● | ● | | ○ | ● | ○ | ○ | ● | ○ |
| | FD5 | ● | ● | | ● | | | | | ● | ○ | ● | ○ |
| | FD6 | ● | | ● | ● | | | ○ | ● | ○ | ● | | |
| | FD7 | ● | ● | | ● | | | ● | | | ○ | ● | ○ |
| | FD8 | ● | | | ● | | ● | ○ | ● | ○ | | | ● |
| | FD9 | ● | | ● | ● | | | ○ | ● | ○ | | | ● |
| EV mode | REV | | | ● | | ● | | ○ | ● | ○ | | | ● |
| | FD1 | | ● | | | ● | | ● | | | ○ | ● | ○ |
| | FD2 | | | ● | | ● | | ○ | ● | ○ | ● | | |
| | FD3 | | ● | | | ● | | | | ● | ○ | ● | ○ |
| | FD4 | | | | ● | ● | | ○ | ● | ○ | ○ | ● | ○ |
| | FD5 | | ● | | ● | | | | | ● | ○ | ● | ○ |
| | FD6 | | | ● | ● | | | ○ | ● | ○ | ● | | |
| | FD7 | | ● | | ● | | | ● | | | ○ | ● | ○ |
| | FD8 | | | | ● | | ● | ○ | ● | ○ | | | ● |
| | FD9 | | | ● | ● | | | ○ | ● | ○ | | | ● |

○ : Preliminary engagement available

| Shift-stage | CL1 | CL2 | CL3 | CL4 | BK | SN1 | | | SN2 | | |
|---|---|---|---|---|---|---|---|---|---|---|---|
| | | | | | | TDG1 | N | TDG2 | TDG3 | N | H |
| REV | | ● | | ● | | ○ | ● | ○ | | | ● |
| FD1 | ● | | | ● | | ● | | | ○ | ● | ○ |
| FD2 | | ● | | ● | | ○ | | ○ | ● | | |
| FD3 | ● | | | ● | | | ● | ● | ○ | ● | ○ |
| FD4 | | | ● | ● | | ○ | | ○ | ○ | ● | ○ |
| FD5 | ● | | ● | | | | ● | ● | ○ | ● | ○ |
| FD6 | | ● | ● | | | ○ | | ○ | ● | | |
| FD7 | ● | | ● | | | ● | ● | | ○ | ● | ○ |
| FD8 | | | ● | | ● | ○ | ● | ○ | ○ | ● | ○ |
| FD9 | | ● | ● | | | ○ | ● | ○ | ○ | | ● |

○ : Preliminary engagement available
● : Preliminary engagement available

…

The first planet carrier may be fixedly connected with the first torque mediating shaft. The first sun gear may be selectively connected with the first input shaft and the transmission housing, respectively. The first torque mediating shaft may be externally gear-meshed with the second planetary gear set. The second torque mediating shaft may be selectively connected with the first torque mediating shaft. The second torque mediating shaft may be selectively connected with the transmission housing.

The second torque mediating shaft may be selectively connected with the first torque mediating shaft and the transmission housing via a second synchronizer.

The second planetary gear set of the compound shifting section may include a second ring gear, a second planet carrier, and the second sun gear. The second ring gear may receive torques from the first and second preliminary shifting sections through a third shifting gear set. The second planet carrier may receive a torque from the second input shaft through the second input gear set. The second sun gear may be selectively connected with the second ring gear and fixedly connected with the output shaft so as to act as an output element.

The second input gear set may include a second input drive gear and a second input driven gear, the second input drive gear fixedly connected with the second input shaft, the second input driven gear fixedly connected with the second planet carrier and externally gear-meshed with the second input drive gear. The third shifting gear set may include a third shifting drive gear, an intermediate gear, and a third shifting driven gear, the third shifting drive gear being fixedly mounted on the first torque mediating shaft, the intermediate gear being fixedly mounted on the second intermediate shaft, the third shifting driven gear being fixedly formed on the second ring gear and externally gear-meshed with the third shifting drive gear and the intermediate gear respectively.

A gear ratio of third shifting drive gear and the third shifting driven gear may be used for the forward second speed and the forward sixth speed.

The power transmission apparatus may further include four clutches each selectively connecting a corresponding pair of rotating members, and a brake selectively connecting a rotating member to the transmission housing.

The four clutches may include a first clutch arranged between the first input shaft and the third input shaft, a second clutch disposed between the first input shaft and the first sun gear of the first planetary gear set, a third clutch arranged between the first input shaft and the second input shaft, and a fourth clutch disposed between the second ring gear and the second sun gear of the second planetary gear set. The brake may be disposed between the first sun gear and the transmission housing.

The power transmission apparatus may further include a motor/generator coaxially coupled with the first input shaft, selectively connected with an engine output shaft through an engine clutch, and selectively connected with the second and third input shafts through respective clutches.

The power transmission apparatus may further include a motor/generator disposed in parallel with the first input shaft, a motor drive gear receiving a torque from the motor/generator, a motor driven gear coaxially formed with the first input shaft, and an idle gear externally gear-meshed with the motor drive gear and the motor driven gear respectively. The torque from the motor/generator may be fixedly delivered to the first input shaft through the motor drive gear, the idle gear, and the motor driven gear.

The motor driven gear may be fixedly coupled with the first input shaft, selectively connected with an engine output shaft through an engine clutch, and selectively connected with the second and third input shafts through respective clutches.

The power transmission apparatus may further include four clutches each selectively connecting a corresponding pair of rotating members, and a brake selectively connecting a shaft to the transmission housing.

The four clutches may include a first clutch arranged between the first input shaft and the third input shaft, a second clutch disposed between the first input shaft and the first sun gear of the first planetary gear set, a third clutch arranged between the first input shaft and the second input shaft, and a fourth clutch disposed between the second ring gear and the second sun gear of the second planetary gear set. The brake may be disposed between the second intermediate shaft and the transmission housing.

A power transmission apparatus for a vehicle may enable shift-stages of nine forward speeds and one reverse speed by applying two planetary gear sets and two synchronizers to a dual clutch transmission, and accordingly multi-stages may be enabled with simpler structure and reduced weight, thereby improving installability and fuel consumption.

A power transmission apparatus for a vehicle according to second and third aspects may further employ one motor/generator compared to the first aspect, and may enable driving in an engine driving mode, a parallel hybrid mode, and an electric vehicle mode, thereby further improving fuel consumption.

Further, effects that can be obtained or expected from the present disclosure are directly or suggestively described in the following detailed description. That is, various effects expected from aspects of the present disclosure will be described in the following detailed description.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
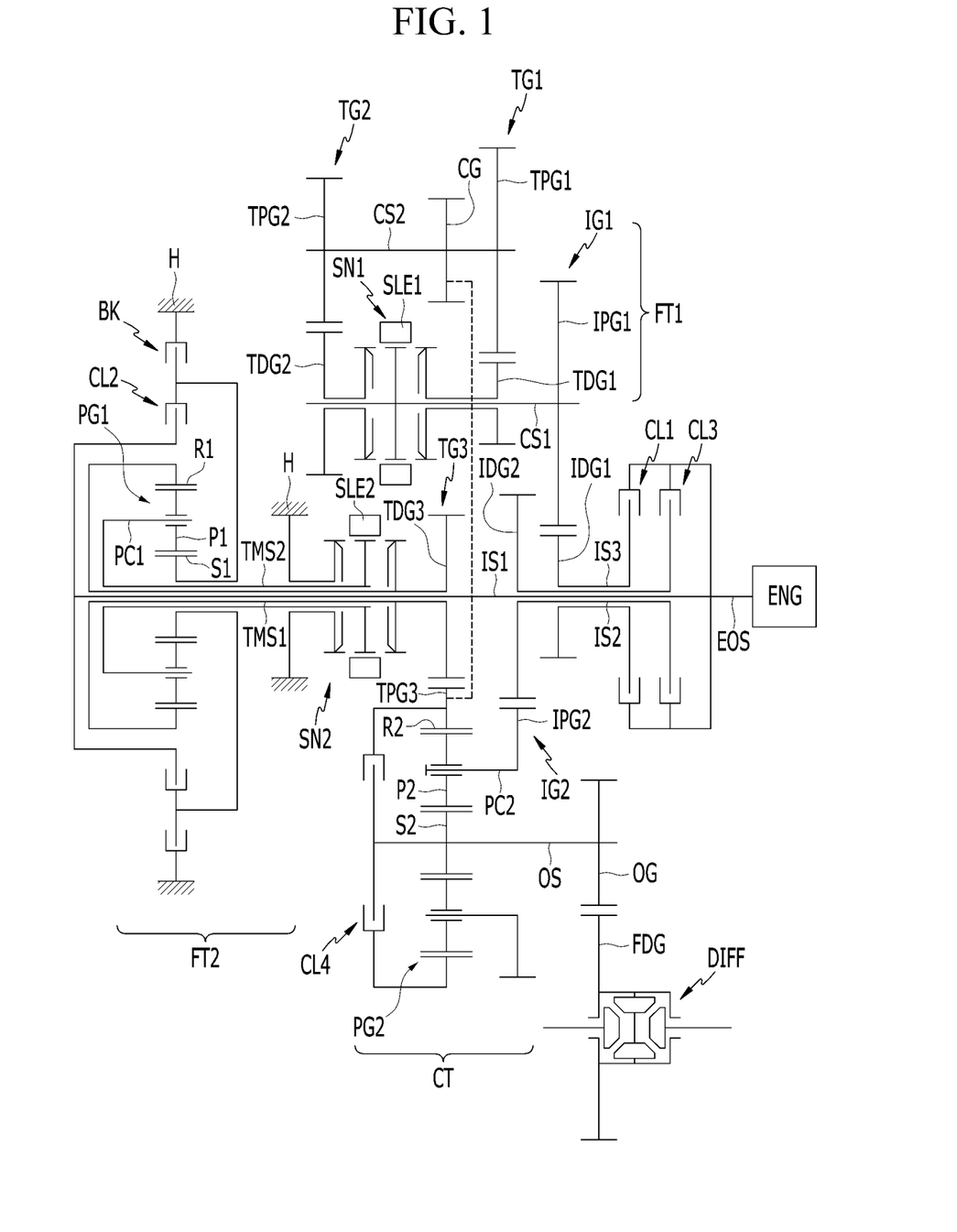
FIG. 1 is a schematic view of a power transmission apparatus for a vehicle.

FIG. 1 is a schematic view of a power transmission apparatus for a vehicle according to a first aspect.

Referring to FIG. 1, a power transmission apparatus according to a first aspect includes first, second, and third input shafts IS1, IS2, and IS3, first and second intermediate shafts CS1 and CS2, first and second torque mediating shafts TMS1 and TMS2, first and second preliminary shifting sections FT1 and FT2, a compound shifting section CT, and an output shaft OS.

The engine ENG as a power source may be realized as a various kind of typical engines such as a gasoline engine or a diesel engine that uses fossil fuel.

A power transmission apparatus according to a first aspect realizes shift-stages of nine forward speeds and one reverse speed. A torque of the engine ENG is shifted into a plurality of fixed shift-stages in the first and second preliminary shifting sections FT1 and FT2, Selectively receiving a torque from the first and second preliminary shifting sections FT1 and FT2 and also selectively receiving a torque from the engine ENG, the compound shifting section CT shifts the received torques and outputs an output torque through the output shaft OS.

The first, second, and third input shafts IS1, IS2, and IS3 and the first and second torque mediating shafts TMS1 and TMS2 are coaxially disposed, The first and second intermediate shafts CS1 and CS2 and the output shaft OS are disposed in parallel with the input shafts IS1, IS2, and IS3 and the torque mediating shafts TMS1 and TMS2. The torque of the engine ENG is transmitted to the first and second preliminary shifting sections FT1 and FT2 and a compound shifting section CT. A first planetary gear set PG1 and first and second synchronizers SN1 and SN2 are included in the first and second preliminary shifting sections FT1 and FT2. A second planetary gear set PG2 is included in the compound shifting section CT.

The first input shaft IS1 is fixedly connected with an output shaft EOS (crankshaft) of the engine ENG. The first input shaft IS1 selectively transmits a torque of the engine ENG to the first planetary gear set PG1 of the preliminary shifting section FT.

The second input shaft IS2, being formed as a hollow shaft, is disposed coaxial with and exterior to the first input shaft IS1 without rotational interference, and selectively connected with the output shaft EOS of the engine ENG. The second input shaft IS2 selectively transmits the torque of the engine ENG to the compound shifting section CT.

The third input shaft IS3, being formed as a hollow shaft, is disposed coaxial with and exterior to the second input shaft IS2 without rotational interference, and selectively connected with the output shaft EOS of the engine ENG. The third input shaft IS3 selectively transmits the torque of the engine ENG to the first intermediate shaft CS1 of the preliminary shifting section FT.

The first torque mediating shaft TMS1 is formed as a hollow shaft and is disposed coaxial with and exterior to the first input shaft IS1. The second torque mediating shaft TMS2 is formed as a hollow shaft and is disposed coaxial with and exterior to the first torque mediating shaft TMS1 without rotational interference.

The first preliminary shifting section FT1 includes the first and second intermediate shafts CS1 and CS2 and the first synchronizer SN1.

The first intermediate shaft CS1 is externally gear-meshed with the third input shaft IS3 through a first input gear set IG1. The second intermediate shaft CS2 is connectable with the first intermediate shaft CS1 by an externally gear-engagement, through first and second shifting gear sets TG1 and TG2.

The first input gear set IG1 includes a first input drive gear IDG1 and a first input driven gear IPG1. The first input drive gear IDG1 is fixedly connected with the third input shaft IS3. The first input driven gear IPG1 is fixedly connected with the first intermediate shaft CS1, and externally gear-meshed with the first input drive gear IDG1.

The first shifting gear set TG1 includes a first shifting drive gear TDG1 and a first driven gear TPG1. The first shifting drive gear TDG1 is disposed coaxial with and exterior to the first intermediate shaft CS1 without rotational interference. The first driven gear TPG1 may be fixedly connected with the second intermediate shaft CS2, and externally gear-meshed with the first shifting drive gear TDG1.

The second shifting gear set TG2 includes a second shifting drive gear TDG2 and a second shifting driven gear TPG2. The second shifting drive gear TDG2 is disposed coaxial with and exterior to the first intermediate shaft CS1 without rotational interference. The second shifting driven gear TPG2 is fixedly connected with the second intermediate shaft CS2, and externally gear-meshed with the second shifting drive gear TDG2.

The first synchronizer SN1 is disposed between the first shifting drive gear TDG1 and the second shifting drive gear TDG2, and thereby the first shifting drive gear TDG1 and the second shifting drive gear TDG2 may be selectively connected with first intermediate shaft CS1.

The second preliminary shifting section FT2 includes the first planetary gear set PG1 and the second synchronizer SN2.

The first planetary gear set PG1 is a single pinion planetary gear set, and includes a first sun gear S1, a first planet carrier PC1 rotatably supporting a plurality of first pinion gears P1 externally gear-meshed with the first sun gear S1, a first ring gear R1 internally gear-meshed with the plurality of first pinion gears P1.

The first sun gear S1 is selectively connected with the first input shaft IS1 and selectively connected with a transmission housing H. The first planet carrier PC1 is fixedly connected with the second torque mediating shaft TMS2. The first ring gear R1 is fixedly connected with the first torque mediating shaft TMS1.

The second synchronizer SN2 is disposed between the transmission housing H and a third shifting drive gear TDG3 fixedly connected with the first torque mediating shaft TMS1, and the second torque mediating shaft TMS2 is selectively connected with one of the third shifting drive gear TDG3 and transmission housing H.

Selectively connecting the second torque mediating shaft TMS2 to transmission housing H means that the second torque mediating shaft TMS2 may be selectively stopped.

The compound shifting section CT includes the second planetary gear set PG2 and the output shaft OS.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2.

The second sun gear S2 is selectively connected with the second ring gear R2 and fixedly connected with the output shaft OS thereby acting as an output element; in one form, always acting as an output element. The second planet carrier PC2 is fixedly connected with a second input driven gear IPG2 and selectively receives the torque of the engine ENG. The second ring gear R2 is fixedly connected with the third shifting driven gear TPG3 and selectively receives a torque from the second synchronizer SN2.

The second planet carrier PC2 is externally gear-meshed with the second input shaft IS2 through a second input gear set IG2. The second ring gear R2 is externally gear-meshed with the second intermediate shaft CS2 and the third shifting drive gear TDG3 by a third shifting gear set TG3.

The second input gear set IG2 includes a second input drive gear IDG2 and the second input driven gear IPG2. The second input drive gear IDG2 is fixedly connected the second input shaft IS2. The second input driven gear IPG2 is fixedly connected with the second planet carrier PC2, and externally gear-meshed with the second input drive gear IDG2.

The third shifting gear set TG3 includes the third shifting drive gear TDG3, an intermediate gear CG fixedly connected with the second intermediate shaft CS2, and the third shifting driven gear TPG3. The third shifting driven gear TPG3 is fixedly connected with the second ring gear R2, and externally gear-meshed with the third shifting drive gear TDG3 and the intermediate gear CG.

Gear ratios in the first and second input gear sets IG1 and IG2, and gear ratios of drive and driven gears in the first, second, and third shifting gear sets TG1, TG2, and TG3 may be appropriately set in consideration of transmission requirements.

According to a first aspect, in addition to gear ratios of the first and second input gear sets IG1 and IG2, the first shifting gear set TG1 is involved in forming a forward first speed FD1 and a forward seventh speed FD7, the second shifting gear set TG2 is involved in forming a forward third speed FD3 and a forward fifth speed FD5, and the third shifting gear set TG3 is involved in forming a forward second speed FD2 and a forward sixth speed FD6.

Forward fourth, eighth, and ninth speeds FD4, FD8, and FD9, and a reverse speed REV may be achieved by cooperative operation of the second preliminary shifting section FT2 and the compound shifting section CT.

The output shaft OS is an output member, and delivers the shifted driving torque received from the second planetary gear set PG2 to a differential DIFF through an output gear OG and a final reduction gear FDG.

In addition, four engagement elements of first, second, third, and fourth clutches CL1, CL2, CL3, and CL4 are disposed between rotating members such as various shafts and rotation elements of the first and second planetary gear sets PG1 and PG2, and one engagement of a brake BK is disposed a rotating member and the transmission housing H.

The five engagement elements of the four clutches CL1 to CL4 and the brake BK are arranged as follows.

The first clutch CL1 is disposed between the engine output shaft EOS and the third input shaft IS3 so as to selectively connect the engine output shaft EOS and third input shaft IS3.

The second clutch CL2 is disposed between the first input shaft IS1 and the first sun gear S1 so as to selectively connect the first input shaft IS1 and first sun gear S1.

The third clutch CL3 is disposed between the engine output shaft EOS and the second input shaft IS2 so as to selectively connect the engine output shaft EOS and second input shaft IS2.

The fourth clutch CL4 is disposed between the second ring gear R2 and the second sun gear S2 (output shaft OS) so as to selectively connect the second ring gear R2 and the second sun gear S2 (output shaft OS).

The fourth clutch CL4 enables the second planetary gear set PG2 to integrally rotate.

The brake BK is disposed between the first sun gear S1 and the transmission housing H, thereby enabling the first sun gear S1 to selectively act as a fixed element.

The engagement elements of the first, second, third, and fourth clutches CL1, CL2, CL3, and CL4 and the brake BK may be realized as multi-plate hydraulic pressure friction devices that are frictionally engaged by hydraulic pressure, however, it should not be understood to be limited thereto, since various other configuration that are electrically controllable may be available.

The first, second, and third synchronizers SN1, SN2, and SN3 may be formed as a known scheme, and the first, second, and third sleeves SLE1, SLE2, and SLE3 applied to the first, second, and third synchronizers SN1, SN2, and SN3 may be operated by respective actuators (not shown) that may be controlled by a transmission control unit.

Figure 2:
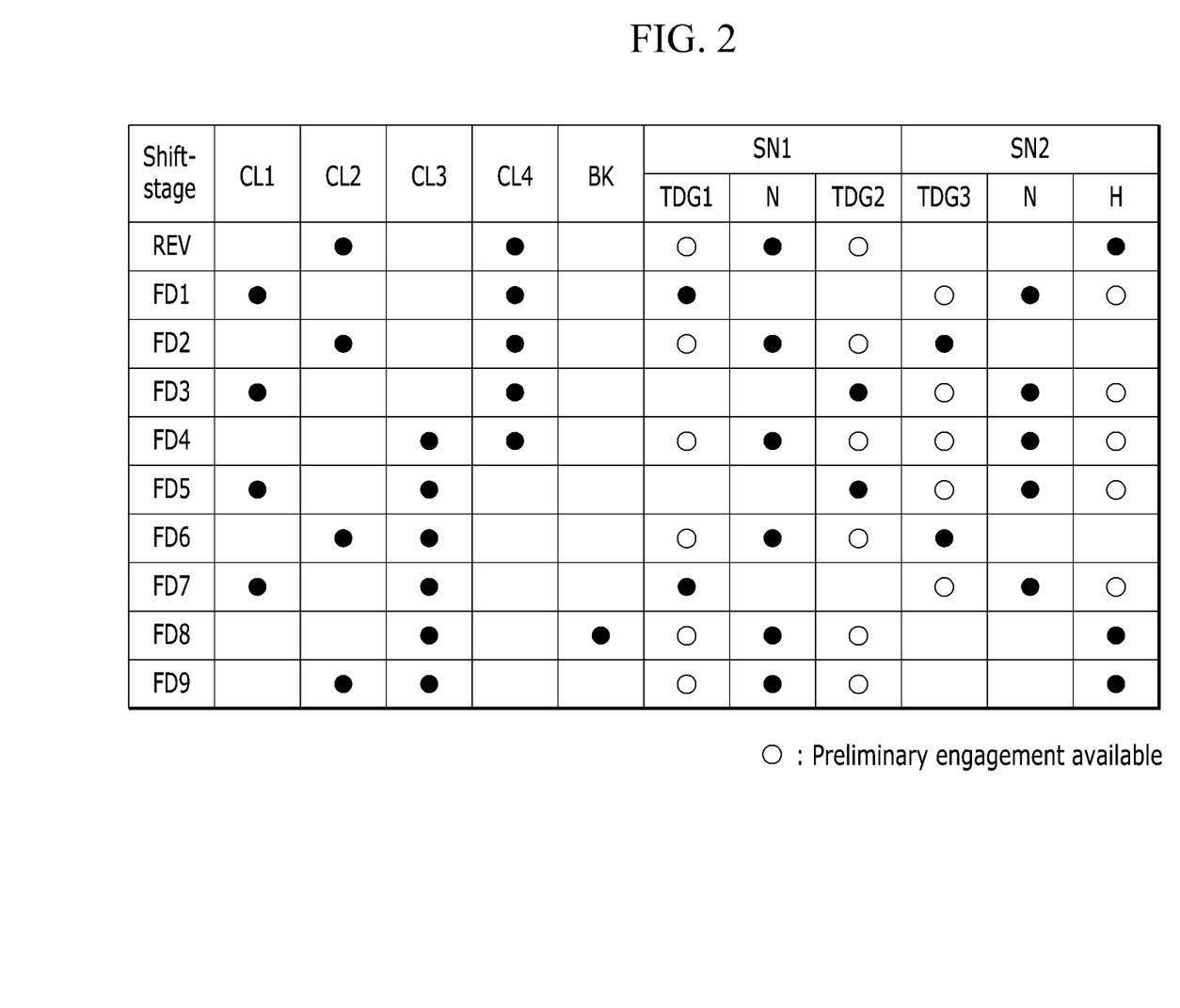
FIG. 2 is a shifting operational chart for a power transmission apparatus for a vehicle.

FIG. 2 is a shifting operational chart for a power transmission apparatus for a vehicle according to a first aspect, and the power transmission apparatus for a vehicle according to a first aspect performs shifting operation as follows.

[The Reverse Speed]

In the reverse speed REV, as shown in FIG. 2, the second torque mediating shaft TMS2 and the transmission housing H are synchronously interconnected by the sleeve SEL2 of the second synchronizer SN2, and the second clutch CL2 and the fourth clutch CL4 are operated.

Then, the torque of the engine ENG is input to the first sun gear S1 of the first planetary gear set PG1 through the first input shaft IS1 and second clutch CL2 by the operation of the second clutch CL2. In such a state, the second torque mediating shaft TMS2 is connected with the transmission housing H by the operation of the second synchronizer SN2, and thereby the first planet carrier PC1 acts as a fixed element.

Then, the first planetary gear set PG1 outputs a reverse torque through the first ring gear R1, and the reverse torque is input to the second ring gear R2 of the second planetary gear set PG2 through the first torque mediating shaft TMS1, the third shifting drive gear TDG3, and the third shifting driven gear TPG3.

In addition, the second planetary gear set PG2 integrally rotates by the operation of the fourth clutch C4, and outputs the reverse torque as inputted to the second ring gear R2, thereby realizing the reverse speed REV and outputting a shifted torque to the differential DIFF through the output shaft OS.

[The Forward First Speed]

In the forward first speed FD1, as shown in FIG. 2, the first shifting drive gear TDG1 and the first intermediate shaft CS1 are synchronously interconnected by the sleeve SLE1 of the first synchronizer SN1, and the first clutch CL1 and the fourth clutch CL4 are operated.

Then, by the operation of the first clutch CL1, the torque of the engine ENG is input to the second ring gear R2 of the second planetary gear set PG2 through the third input shaft IS3, the first input drive gear IDG1, the first input driven gear IPG1, the first intermediate shaft CS1, the first shifting drive gear TDG1, the first shifting driven gear TPG1, the second intermediate shaft CS2, the intermediate gear CG, and the third shifting driven gear TPG3.

In addition, the second planetary gear set PG2 integrally rotates by the operation of the fourth clutch C4, and outputs the torque as inputted to the second ring gear R2, thereby realizing the forward first speed FD1 and outputting a shifted torque to the differential DIFF through the output shaft OS.

That is, the forward first speed is realized by the gear ratios of first input drive gear IDG1, the first input driven gear IPG1, the first shifting drive gear TDG1, the first shifting driven gear TPG1, the intermediate gear CG, and the third shifting driven gear TPG3.

[The Forward Second Speed]

In the forward second speed FD2, as shown in FIG. 2, the second shifting drive gear TDG2 and the second torque mediating shaft TMS2 are synchronously connected by the sleeve SLE2 of the second synchronizer SN2, and the second clutch CL2 and the fourth clutch CL4 are operated.

Then, the torque of the engine ENG is input to the first sun gear S1 of the first planetary gear set PG1 through the first input shaft IS1 and second clutch CL2 by the operation of the second clutch CL2. In such a state, the second torque mediating shaft TMS2 and the third shifting drive gear TDG3 are interconnected by the operation of the second synchronizer SN2, thereby enabling first planetary gear set PG1 to integrally rotate, and a torque output from the first planetary gear set PG1 is input to the second ring R2 of the second planetary gear set PG2 through the third shifting drive gear TDG3 and the third shifting driven gear TPG3.

In addition, the second planetary gear set PG2 integrally rotates by the operation of the fourth clutch C4, and outputs the torque as inputted to the second ring gear R2, thereby realizing the forward second speed FD2 and outputting a shifted torque to the differential DIFF through the output shaft OS.

That is, the forward second speed is realized by the gear ratios of third shifting drive gear TDG3 and the third shifting driven gear TPG3.

[The Forward Third Speed]

In the forward third speed FD3, as shown in FIG. 2, the second shifting drive gear TDG2 and the first intermediate shaft CS1 are synchronously interconnected by the sleeve SEL1 of the first synchronizer SN1, and the first clutch CL1 and the fourth clutch CL4 are operated.

Then, by the operation of the first clutch CL1, the torque of the engine ENG is input to the second ring gear R2 of the second planetary gear set PG2 through the third input shaft IS3, the first input drive gear IDG1, the first input driven gear IPG1, the first intermediate shaft CS1, the second shifting drive gear TDG2, the second shifting driven gear TPG2, the second intermediate shaft CS2, the intermediate gear CG, and the third shifting driven gear TPG3.

In addition, the second planetary gear set PG2 integrally rotates by the operation of the fourth clutch C4, and outputs the torque as inputted to the second ring gear R2, thereby realizing the forward third speed FD3 and outputting a shifted torque to the differential DIFF through the output shaft OS.

That is, the forward third speed is realized by the gear ratios of the first input drive gear IDG1, the first input driven gear IPG1, the second shifting drive gear TDG2, the second shifting driven gear TPG2, the intermediate gear CG, and the third shifting driven gear TPG3.

[The Forward Fourth Speed]

In the forward fourth speed FD4, as shown in FIG. 2, first and second synchronizers SN1 and SN2 are in a neutral state, and the third clutch CL3 and the fourth clutch CL4 are operated.

Then, by the operation of the third clutch CL3, the torque of the engine ENG is input to the second planet carrier PC2 of the second planetary gear set PG2 through the second input shaft IS2, the second input drive gear IDG2, and the second input driven gear IPG2.

In addition, the second planetary gear set PG2 integrally rotates by the operation of the fourth clutch C4, and outputs the torque as inputted to the second planet carrier PC2, thereby realizing the forward fourth speed FD4 and outputting a shifted torque to the differential DIFF through the output shaft OS.

That is, the forward fourth speed is realized by the gear ratios of the second input drive gear IDG2 and the second input driven gear IPG2.

[The Forward Fifth Speed]

In the forward fifth speed FD5, as shown in FIG. 2, the second shifting drive gear TDG2 and the first intermediate shaft CS1 are synchronously interconnected by the sleeve SEL1 of the first synchronizer SL1, and the first clutch CL1 and the third clutch CL3 are operated.

Then, by the operation of the first clutch CL1, the torque of the engine ENG is partially input to the second ring gear R2 of the second planetary gear set PG2 through the third input shaft IS3, the first input drive gear IDG1, the first input driven gear IPG1, the first intermediate shaft CS1, the second shifting drive gear TDG2, the second shifting driven gear TPG2, the second intermediate shaft CS2, the intermediate gear CG, and the third shifting driven gear TPG3.

In addition, by the operation of the third clutch CL3, the torque of the engine ENG is partially input to the second planet carrier PC2 of the second planetary gear set PG2 through the second input shaft IS2, the second input drive gear IDG2, and the second input driven gear IPG2.

Then, the second planetary gear set PG2 receives different torques through the second ring gear R2 and the second planet carrier PC2. In this state, in comparison to the rotation speed input to the second planet carrier PC2, the rotation speed input to the second ring gear R2 is smaller and thus the second planetary gear set PG2 outputs an increased rotation speed, thereby realizing the forward fifth speed FD5 and outputting a shifted torque to the differential DIFF through the second sun gear S2 and the output shaft OS.

[The Forward Sixth Speed]

In the forward sixth speed FD6, as shown in FIG. 2, the third shifting drive gear TDG3 and the second torque mediating shaft TMS2 are synchronously interconnected by the sleeve SEL2 of the second synchronizer SL2, and the second clutch CL2 and the third clutch CL3 are operated.

Then, by the operation of the second clutch CL2, the torque of the engine ENG is partially input to the first sun gear S1 of the first planetary gear set PG1 through the first input shaft IS1 and the second clutch CL2. In such a state, the second torque mediating shaft TMS2 and the third shifting drive gear TDG3 are interconnected by the operation of the second synchronizer SN2, thereby enabling first planetary gear set PG1 to integrally rotate, and a torque output from the first planetary gear set PG1 is input to the second ring R2 of the second planetary gear set PG2 through the third shifting drive gear TDG3 and the third shifting driven gear TPG3.

In addition, by the operation of the third clutch CL3, the torque of the engine ENG is partially input to the second planet carrier PC2 of the second planetary gear set PG2 through the second input shaft IS2, the second input drive gear IDG2, and the second input driven gear IPG2.

Then, the second planetary gear set PG2 receives different torques through the second ring gear R2 and the second planet carrier PC2. In this state, in comparison to the rotation speed input to the second planet carrier PC2, the rotation speed input to the second ring gear R2 is further smaller than in the forward fifth speed, and thus the second planetary gear set PG2 outputs a further increased rotation speed, thereby realizing the forward sixth speed FD6 and outputting a shifted torque to the differential DIFF through the second sun gear S2 and the output shaft OS.

[The Forward Seventh Speed]

In the forward seventh speed FD7, as shown in FIG. 2, the first shifting drive gear TDG1 and the first intermediate shaft CS1 are synchronously interconnected by the sleeve SEL1 of the first synchronizer SL1, and the first clutch CL1 and the third clutch CL3 are operated.

Then, by the operation of the first clutch CL1, the torque of the engine ENG is partially input to the second ring gear R2 of the second planetary gear set PG2 through the third input shaft IS3, the first input drive gear IDG1, the first input driven gear IPG1, the first intermediate shaft CS1, the first shifting drive gear TDG1, the first shifting driven gear TPG1, the second intermediate shaft CS2, the intermediate gear CG, and the third shifting driven gear TPG3.

In addition, by the operation of the third clutch CL3, the torque of the engine ENG is partially input to the second planet carrier PC2 of the second planetary gear set PG2 through the second input shaft IS2, the second input drive gear IDG2, and the second input driven gear IPG2.

Then, the second planetary gear set PG2 receives different torques through the second ring gear R2 and the second planet carrier PC2. In this state, in comparison to the rotation speed input to the second planet carrier PC2, the rotation speed input to the second ring gear R2 is further smaller than in the forward sixth speed, and thus the second planetary gear set PG2 outputs a further increased rotation speed, thereby realizing the forward seventh speed FD7 and outputting a shifted torque to the differential DIFF through the second sun gear S2 and the output shaft OS.

[The Forward Eighth Speed]

In the forward eighth speed FD8, as shown in FIG. 2, the second torque mediating shaft TMS2 and the transmission housing H are interconnected by the operation of the sleeve SEL2 of the second synchronizer SL2, and the third clutch CL3 and the brake BK are operated.

Then, the first planetary gear set PG1 becomes entirely stationary since the first planet carrier PC1 is stationary by the operation of the second synchronizer SN2, and the first sun gear S1 is stationary by the operation of the brake BK.

Accordingly, the third shifting drive gear TDG3 fixedly connected with the first torque mediating shaft TMS1 is stationary, and therefore, the second ring gear R2 of the second planetary gear set PG2 acts as a fixed element since the third shifting driven gear TPG3 fixedly connected to the second ring gear R2 is stationary.

While the second ring gear R2 acts as a fixed element, the torque of the engine ENG is input to the second planet carrier PC2 of the second planetary gear set PG2 by the operation of the third clutch CL3.

Then, in comparison to the rotation speed input to the second planet carrier PC2, the second ring gear R2 is stationary and thus the second planetary gear set PG2 outputs a further increased speed than in the forward seventh speed, thereby realizing the forward eighth speed FD8 and outputting a shifted torque to the differential DIFF through the second sun gear S2 and the output shaft OS.

[The Forward Ninth Speed]

In the forward ninth speed FD9, as shown in FIG. 2, the second torque mediating shaft TMS2 and the transmission housing H are interconnected by the operation of the sleeve SEL2 of the second synchronizer SL2, and the second clutch CL2 and the third clutch CL3 are operated.

Then, by the operation of the second clutch CL2, the torque of the engine ENG is partially input to the first sun gear S1 of the first planetary gear set PG1 through the first input shaft IS1 and the second clutch CL2. In such a state, the second torque mediating shaft TMS2 is connected with the transmission housing H by the operation of the second synchronizer SN2, thereby enabling the first planet carrier PC1 to act as a fixed element.

Then, the first planetary gear set PG1 outputs a reverse torque through the first ring gear R1, and the reverse torque is input to the second ring gear R3 of the second planetary gear set PG2 through the first torque mediating shaft TMS1, the third shifting drive gear TDG3, and the third shifting driven gear TPG3.

In addition, by the operation of the third clutch CL3, the torque of the engine ENG is partially input to the second planet carrier PC2 of the second planetary gear set PG2 through the second input shaft IS2, the second input drive gear IDG2, and the second input driven gear IPG2.

Then, the second planetary gear set PG2 receives different torques through the second ring gear R2 and the second planet carrier PC3. In this state, in comparison to the rotation speed input to the second planet carrier PC2, the second ring gear R2 receives reverse rotation input, and thus the second planetary gear set PG2 outputs a further increased speed than in the forward eighth speed, thereby realizing the forward ninth speed FD9 and outputting a shifted torque to the differential DIFF through the second sun gear S2 and the output shaft OS.

Figure 3:
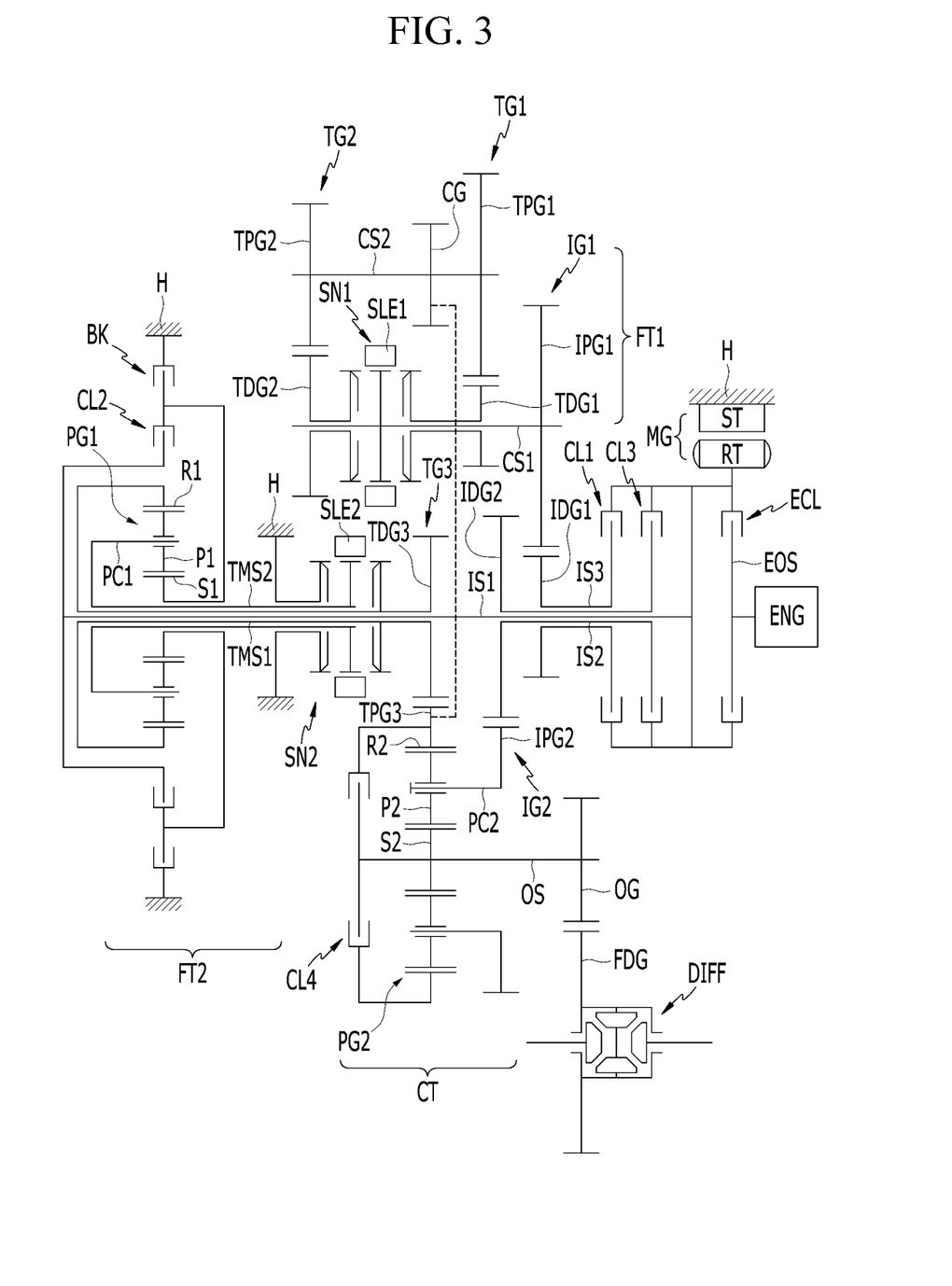
FIG. 3 is a schematic view of a power transmission apparatus for a vehicle.

FIG. 3 is a schematic view of a power transmission apparatus for a vehicle according to a second aspect.

Referring to FIG. 3, in comparison with the first aspect, a second aspect further includes a motor/generator MG as an auxiliary power source such that a vehicle applied with the power transmission apparatus may be enabled with driving in a parallel hybrid mode and in an electric vehicle mode.

The motor/generator MG may act as a motor and as a generator, and includes a stator ST, which is fixed to the transmission housing H, and a rotor RT rotatably supported within the stator ST.

The motor/generator MG is disposed to be rear of the engine ENG. The rotor RT is selectively connected with the output shaft EOS of the engine ENG interposing an engine clutch ECL, fixedly connected with the first input shaft IS1, and selectively connected with the second and third input shafts IS2 and IS3 interposing the first and third clutches CL1 and CL3.

When the engine clutch ECL is operated, a driving torque of the engine ENG is input to the power transmission apparatus. In this state, a torque of the motor/generator MG may also be applied, thereby enabling a driving mode of a parallel hybrid driving mode, where both of an engine torque and a motor torque are used for driving a vehicle.

When the engine clutch ECL is released, the torque of the motor/generator MG may act as a sole power source, and a vehicle may be driven in an electric vehicle mode (EV).

Figure 4:
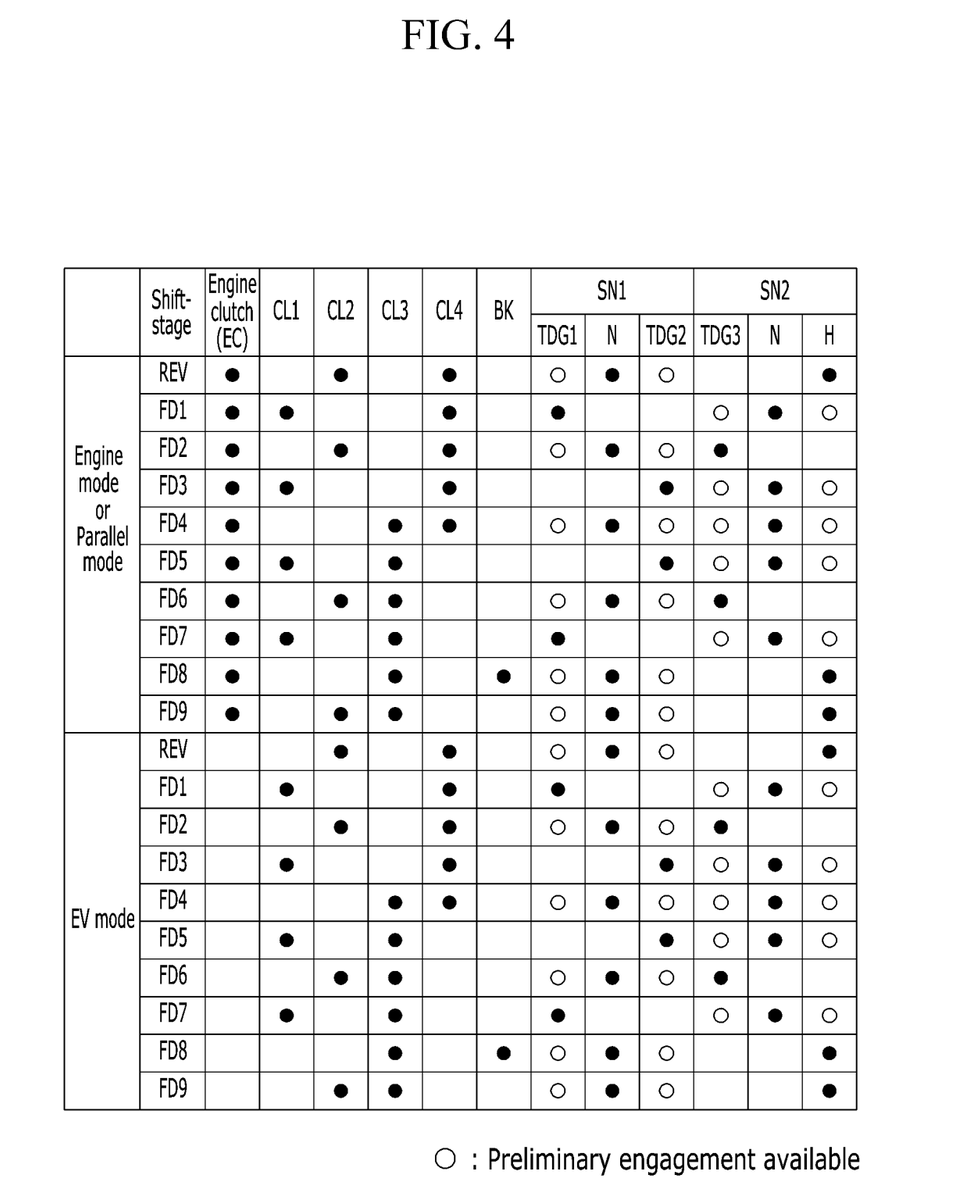
FIG. 4 is a shifting operational chart for a power transmission apparatus for a vehicle.

FIG. 4 is a shifting operational chart for a power transmission apparatus for a vehicle according to a second aspect, and the power transmission apparatus for a vehicle according to a second aspect performs shifting operation as follows.

Referring to FIG. 4, when the engine clutch ECL is operated, nine forward speeds and one reverse speed is realized by the same operation of the clutches and the brake, since the torque of the motor/generator MG is merely an assistant torque to driving a vehicle and does not affect shifting operation of a power transmission apparatus.

In the electric vehicle mode EV, the torque of the motor/generator MG is used for driving a vehicle and does not affect shifting operation of a power transmission apparatus. Therefore, nine forward speeds and one reverse speed is realized by the same operation of the clutches and the brake.

Figure 5:
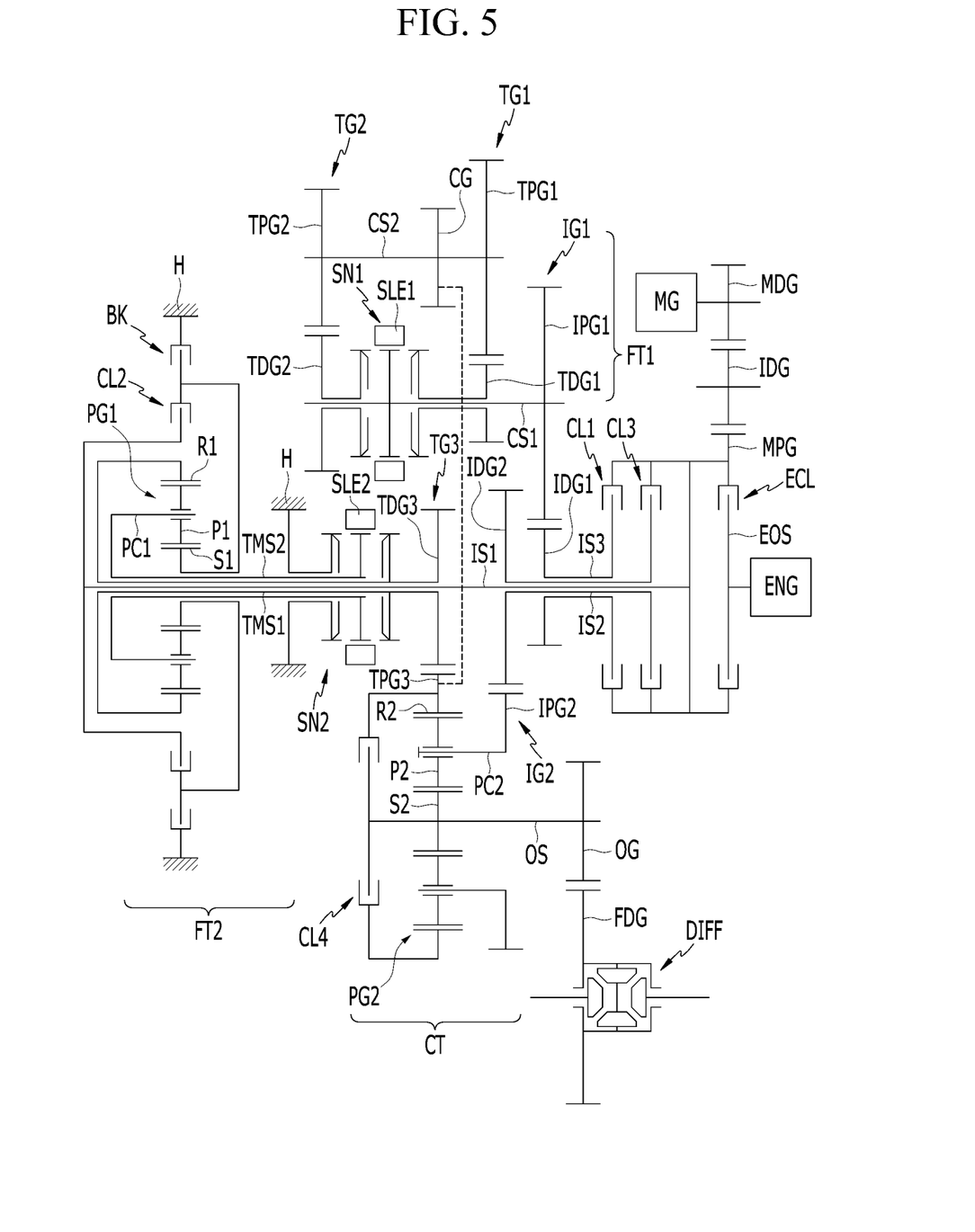
FIG. 5 is a schematic view of a power transmission apparatus for a vehicle.

FIG. 5 is a schematic view of a power transmission apparatus for a vehicle according to a third aspect.

Referring to FIG. 5, the third aspect differs from the second form or aspect in that, while employing the motor/generator MG as an auxiliary power source, the motor/generator MG is disposed in parallel with the first, second, and third input shafts IS1, IS2, and IS3, differently from the second form where the motor/generator MG coaxially disposed with the first, second, and third input shafts IS1, IS2, and IS3.

In order to apply the torque from motor/generator MG, the power transmission apparatus further includes a motor drive gear MDG, a motor driven gear MPG, and an idle gear IDG disposed between the motor drive gear MDG and the motor driven gear MPG. The motor driven gear MPG is selectively connected with the engine output shaft EOS interposing the engine clutch ECL.

The motor driven gear MPG is fixedly connected with the first input shaft IS1, and selectively connected with the second and third input shafts IS2 and IS3 interposing the third and first clutches CL3 and CL1.

With this configuration, a vehicle may be driven alternatively in a parallel hybrid driving mode or an electric vehicle mode, depending on the operation of the engine clutch ECL.

A power transmission apparatus according to the third aspect may realize the same shift-stages by the same operation of clutches and the brake as in the second form.

Figure 6:
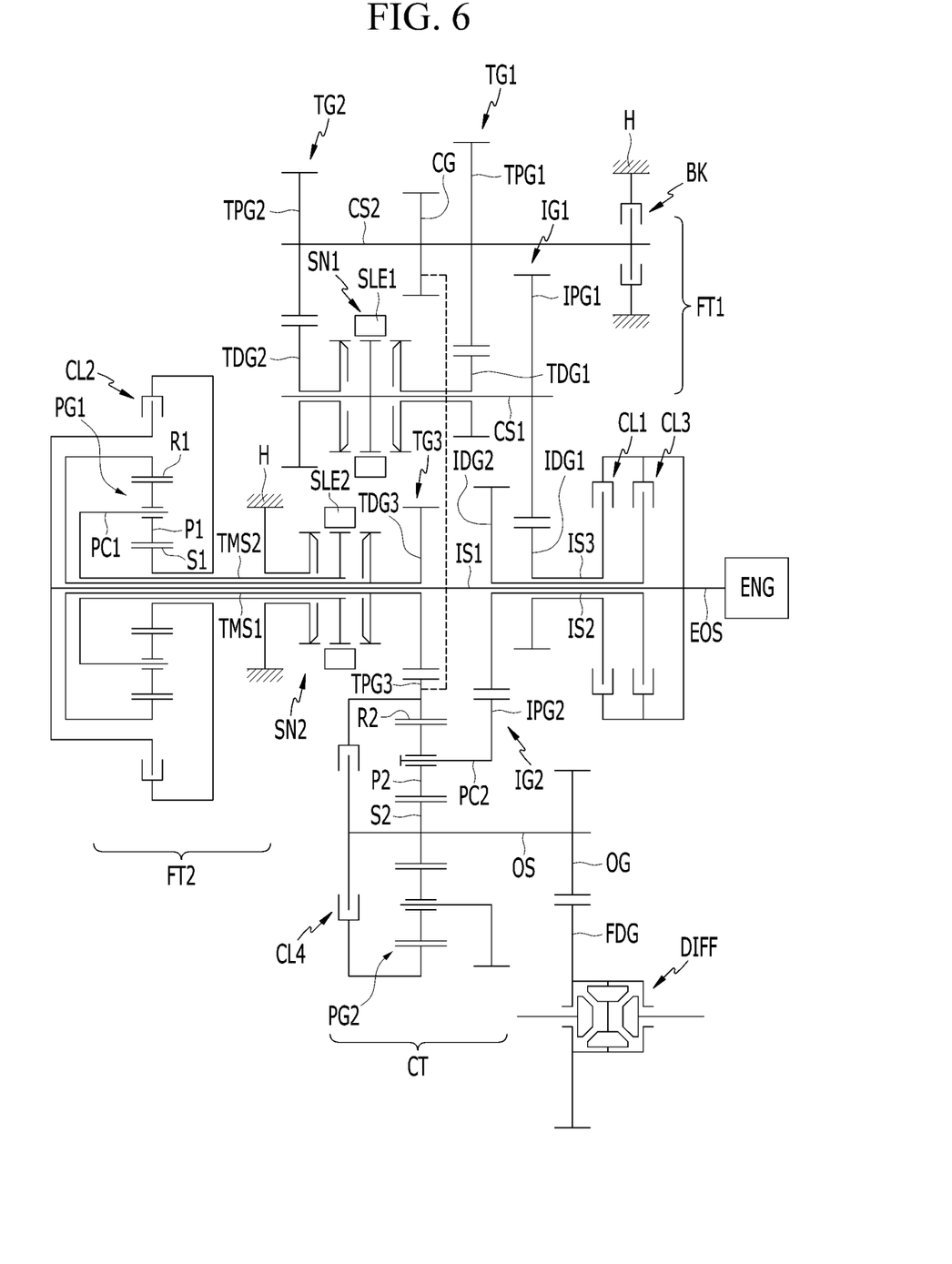
FIG. 6 is a schematic view of a power transmission apparatus for a vehicle.

FIG. 6 is a schematic view of a power transmission apparatus for a vehicle according to a fourth aspect.

Referring to FIG. 6, a fourth aspect differs from the first aspect in the location of the brake BK.

While the brake BK is disposed between the first sun gear S1 and the transmission housing H in the first aspect, the brake BK is disposed between the second intermediate shaft CS2 and the transmission housing H.

A power transmission apparatus according to the fourth aspect realizes the same shift-stages by the same operation of clutches and the brake as in the first aspect, which is described in detail with reference to FIG. 7.

Figure 7:
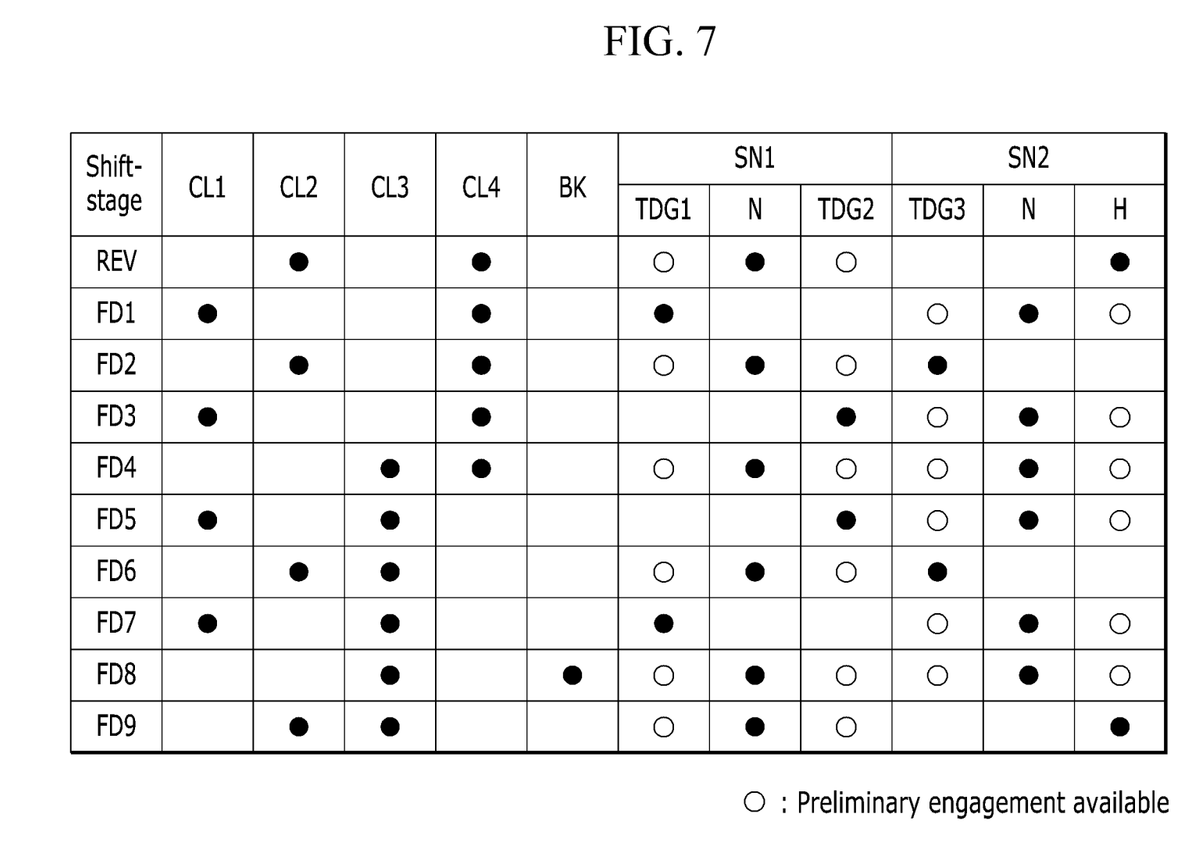
FIG. 7 is a shifting operational chart for a power transmission apparatus for a vehicle.

FIG. 7 is a shifting operational chart for a power transmission apparatus for a vehicle according to a fourth aspect, and the power transmission apparatus for a vehicle according to a fourth aspect performs shifting operation as follows.

FIG. 7 shows the same operational chart as FIG. 2, the operational chart for the first aspect, which means that the power transmission apparatus according to a fourth aspect realizes the same shift-stages by operating the same engagement elements as in the first aspect.

The brake BK is only operated in the forward eighth speed FD8, both in the first and fourth aspects or forms.

According to the first form, the brake BK is operated to stop the first sun gear S1 and the first pinion carrier PC1 is also stopped by the second synchronizer. Thus the first planetary gear set PG1 is integrally stopped, and thereby the second ring gear R2 fixedly connected with the first ring gear R1 acts as a fixed element.

According to the fourth aspect, the brake BK is operated to stop the second intermediate shaft CS2. Therefore, since the second ring gear R2 is fixedly connected with the second intermediate shaft CS2 through the intermediate gear CG, the second ring gear R2 is also stopped and acts as a fixed element.

While the second ring gear R2 acts as a fixed element, the torque of the engine ENG is input to the second planet carrier PC2 of the second planetary gear set PG2 by the operation of the third clutch CL3.

Then, in comparison to the rotation speed input to the second planet carrier PC2, the second ring gear R2 is stationary and thus the second planetary gear set PG2 outputs a further increased speed than in the forward seventh speed, thereby realizing the forward eighth speed FD8 and outputting a shifted torque to the differential DIFF through the second sun gear S2 and the output shaft OS.

As described above, a power transmission apparatus for a vehicle according to a first aspect enables shift-stages of nine forward speeds and one reverse speed by applying two planetary gear sets and two synchronizers to a dual clutch transmission, and accordingly multi-stages may be enabled with simpler structure and reduced weight, thereby improving installability and fuel consumption.

A power transmission apparatus for a vehicle according to second and third aspects further employs one motor/generator to the first aspect, and enables driving in an engine driving mode, a parallel hybrid mode, and an electric vehicle mode, thereby further improving fuel consumption.

It is to be understood that the present aspects are not limited to the disclosed forms, but, on the contrary, are intended to cover various modifications and equivalent arrangements included within the spirit and scope of the appended claims.

DESCRIPTION OF SYMBOLS

BK: brake
CL1,CL2,CL3,CL4: first, second, third, and fourth clutches
CS1, CS2: first and second intermediate shafts
CT: compound shifting section
FT1, FT2: first and second preliminary shifting sections
EOS: engine output shaft (crankshaft)
IG1, IG2: first and second input gear sets
IDG1, IDG2: first and second input drive gears
IPG1, IPG2: first and second input driven gears
IS1, IS2, IS3, first, second, and third input shafts
OG: output gear
OS: output shaft
TG1, TG2, TG3: first, second, and third shifting gear sets
TDG1, TDG2, TDG3: first, second, and third shifting drive gears
TPG1, TPG2, TPG3: first, second, and third shifting driven gears
PG1, PG2: first and second planetary gear sets
SN1, SN2, SN3: first, second, and third synchronizers
TMS1, TMS2: first and second torque mediating shafts

What is claimed is:

1. A power transmission apparatus for a vehicle, comprising:
   a first input shaft for receiving an input torque;
   a second input shaft formed as a hollow shaft, coaxially and exteriorly disposed with the first input shaft without rotational interference, and selectively connected with first input shaft;
   a third input shaft formed as a hollow shaft, coaxially and exteriorly disposed with the second input shaft without rotational interference, and selectively connected with first input shaft;
   a first torque mediating shaft formed as a hollow shaft and coaxially and exteriorly disposed with the first input shaft without rotational interference;
   a second torque mediating shaft formed as a hollow shaft and coaxially and exteriorly disposed with the first torque mediating shaft without rotational interference;
   first and second intermediate shafts and an output shaft respectively disposed in parallel with the first input shaft;
   a first preliminary shifting section receiving a torque through a first input gear set externally gear-meshed with the third input shaft, selectively shifting the received torque by gear ratios of first and second shifting gear sets, and outputting the shifted torque;
   a second preliminary shifting section including a first planetary gear set having three rotation elements including a first sun gear selectively connected with the first input shaft, and outputting a torque among a forward torque, a reverse torque, and a stationary torque by operating the first planetary gear set; and
   a compound shifting section including a second planetary gear set having three rotation elements including a second sun gear fixedly connected with the output shaft, forming an output torque by a torque received from the second input shaft through a second input gear set and torques received from the first and second preliminary shifting sections, and outputting the output torque through the output shaft.

2. The power transmission apparatus of claim 1, wherein:
   the first input gear set comprises a first input drive gear and a first input driven gear, the first input drive gear being fixedly connected with the third input shaft, the first input driven gear being fixedly connected the first intermediate shaft and externally gear-meshed with the first input drive gear;
   the first shifting gear set comprises a first shifting drive gear and a first shifting driven gear, the first shifting drive gear disposed coaxial with and exterior to the first intermediate shaft without rotational interference, the first shifting driven gear fixedly connected the second intermediate shaft and externally gear-meshed with the first shifting drive gear; and
   the second shifting gear set comprises a second shifting drive gear and a second shifting driven gear, the second shifting drive gear disposed coaxial with and exterior to the first intermediate shaft without rotational interference, the second shifting driven gear fixedly connected the second intermediate shaft and externally gear-meshed with the second shifting drive gear.

3. The power transmission apparatus of claim 2, wherein the first shifting drive gear and the second shifting drive gear are selectively connected with the first intermediate shaft by a first synchronizer.

4. The power transmission apparatus of claim 2, wherein:
   a gear ratio of the first shifting gear set is used for a forward first speed and a forward seventh speed; and
   a gear ratio of the second shifting gear set is used for a forward third speed and a forward fifth speed.

5. The power transmission apparatus of claim 1, wherein:
   the first planetary gear set of the second preliminary shifting section comprises a first ring gear, a first planet carrier, and the first sun gear;
   the first ring gear is fixedly connected with the second torque mediating shaft;
   the first planet carrier is fixedly connected with the first torque mediating shaft;
   the first sun gear is selectively connected with the first input shaft and a transmission housing, respectively;
   the first torque mediating shaft is externally gear-meshed with the second planetary gear set;
   the second torque mediating shaft is selectively connected with the first torque mediating shaft; and
   the second torque mediating shaft is selectively connected with the transmission housing.

6. The power transmission apparatus of claim 5, wherein the second torque mediating shaft is selectively connected with the first torque mediating shaft and the transmission housing via a second synchronizer.

7. The power transmission apparatus of claim 1, wherein:
   the second planetary gear set of the compound shifting section comprises a second ring gear, a second planet carrier, and the second sun gear;
   the second ring gear receives torques from the first and second preliminary shifting sections through a third shifting gear set;
   the second planet carrier receives a torque from the second input shaft through the second input gear set; and
   the second sun gear is selectively connected with the second ring gear and fixedly connected with the output shaft so as to act as an output element.

8. The power transmission apparatus of claim 7, wherein:
   the second input gear set comprises a second input drive gear and a second input driven gear, the second input drive gear fixedly connected with the second input shaft, the second input driven gear fixedly connected with the second planet carrier and externally gear-meshed with the second input drive gear; and
   the third shifting gear set comprises a third shifting drive gear, an intermediate gear, and a third shifting driven gear, the third shifting drive gear being fixedly mounted on the first torque mediating shaft, the intermediate gear being fixedly mounted on the second intermediate shaft, the third shifting driven gear being fixedly formed on the second ring gear and externally gear-meshed with the third shifting drive gear and the intermediate gear respectively.

9. The power transmission apparatus of claim 8, wherein a gear ratio of the third shifting drive gear and the third shifting driven gear is used for a forward second speed and a forward sixth speed.

10. The power transmission apparatus of claim 1, further comprising:
    four clutches each selectively connecting a corresponding pair of rotating members; and
    a brake selectively connecting a rotating member to the transmission housing.

11. The power transmission apparatus of claim 10, wherein the four clutches comprise:
a first clutch arranged between the first input shaft and the third input shaft;
a second clutch disposed between the first input shaft and the first sun gear of the first planetary gear set;
a third clutch arranged between the first input shaft and the second input shaft; and
a fourth clutch disposed between a second ring gear and the second sun gear of the second planetary gear set, and wherein the brake is disposed between the first sun gear and the transmission housing.

12. The power transmission apparatus of claim 1, further comprising a motor/generator coaxially coupled with the first input shaft, selectively connected with an engine output shaft through an engine clutch, and selectively connected with the second and third input shafts through respective clutches.

13. The power transmission apparatus of claim 1, further comprising:
a motor/generator disposed in parallel with the first input shaft,
a motor drive gear receiving a torque from the motor/generator,
a motor driven gear coaxially formed with the first input shaft,
an idle gear externally gear-meshed with the motor drive gear and the motor driven gear respectively, wherein the torque from the motor/generator is fixedly delivered to the first input shaft through the motor drive gear, the idle gear, and the motor driven gear.

14. The power transmission apparatus of claim 13, wherein the motor driven gear is fixedly coupled with the first input shaft, selectively connected with an engine output shaft through an engine clutch, and selectively connected with the second and third input shafts through respective clutches.

15. The power transmission apparatus of claim 1, further comprising:
four clutches each selectively connecting a corresponding pair of rotating members; and
a brake selectively connecting a shaft to the transmission housing.

16. The power transmission apparatus of claim 15, wherein the four clutches comprise:
a first clutch arranged between the first input shaft and the third input shaft;
a second clutch disposed between the first input shaft and the first sun gear of the first planetary gear set;
a third clutch arranged between the first input shaft and the second input shaft; and
a fourth clutch disposed between the second ring gear and the second sun gear of the second planetary gear set, and wherein the brake is disposed between the second intermediate shaft and the transmission housing.

* * * * *

UNITED STATES PATENT AND TRADEMARK OFFICE
CERTIFICATE OF CORRECTION

PATENT NO. : 10,746,271 B2  
APPLICATION NO. : 16/144559  
DATED : August 18, 2020  
INVENTOR(S) : Seong Wook Hwang et al.

Page 1 of 1

It is certified that error appears in the above-identified patent and that said Letters Patent is hereby corrected as shown below:

On the Title Page

Item (72):  
Listing of Inventors, the nineteenth inventor, please delete "Ki DOng KIM" and replace with  
--Ki Dong KIM--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*